(12) United States Patent
Gibson (10) Patent No.: US 9,150,377 B2
(45) Date of Patent: Oct. 6, 2015

(54) DOUBLE-SIDED TAPE DISPENSER

(71) Applicant: Shadrach J. Gibson, El Granada, CA (US)

(72) Inventor: Shadrach J. Gibson, El Granada, CA (US)

(*) Notice: Subject to any disclaimer, the term of this patent is extended or adjusted under 35 U.S.C. 154(b) by 0 days.

(21) Appl. No.: 14/327,400

(22) Filed: Jul. 9, 2014

(65) Prior Publication Data

US 2015/0075723 A1  Mar. 19, 2015

Related U.S. Application Data

(60) Provisional application No. 61/844,314, filed on Jul. 9, 2013.

(51) Int. Cl.
| | |
|---|---|
| *B44C 7/00* | (2006.01) |
| *B29C 65/00* | (2006.01) |
| *B65H 35/00* | (2006.01) |
| *B65H 39/16* | (2006.01) |
| *B29C 63/00* | (2006.01) |
| *B29C 65/50* | (2006.01) |

(52) U.S. Cl.
CPC ............ *B65H 35/004* (2013.01); *B65H 35/008* (2013.01); *B65H 35/0033* (2013.01); *B65H 39/16* (2013.01); *B29C 63/00* (2013.01); *B29C 65/00* (2013.01); *B29C 65/50* (2013.01); *Y10T 156/1361* (2015.01); *Y10T 156/1741* (2015.01); *Y10T 156/1795* (2015.01)

(58) Field of Classification Search
CPC  B29C 65/00; B29C 63/0026; B29C 66/4722; B29C 70/00; B65H 35/00; B65H 37/00; B65H 35/004; B65H 39/16; B65H 35/0033; Y10T 156/12; Y10T 156/1348; Y10T 156/1357; Y10T 156/1361; Y10T 156/1795; Y10T 156/1352; Y10T 156/1741
See application file for complete search history.

(56) References Cited

U.S. PATENT DOCUMENTS

| | | | | |
|---|---|---|---|---|
| 3,187,968 | A * | 6/1965 | Favre | ............................... 225/56 |
| 4,415,400 | A | 11/1983 | Rammelmeyr | |
| 4,582,737 | A | 4/1986 | Torgerson et al. | |
| 4,588,469 | A * | 5/1986 | Hunter | ........................ 156/527 |
| 4,981,537 | A | 1/1991 | Heil et al. | |
| 5,269,871 | A * | 12/1993 | Longworth et al. | .......... 156/527 |
| 6,478,068 | B1 * | 11/2002 | Brown | .......................... 156/577 |
| 7,028,736 | B1 * | 4/2006 | Miller | ............................ 156/543 |
| 7,921,896 | B2 | 4/2011 | Andersen | |
| 2009/0107613 | A1 * | 4/2009 | Cosentino | ....................... 156/71 |
| 2010/0300625 | A1 | 12/2010 | Hardy | |
| 2013/0020029 | A1 * | 1/2013 | Lazar | ............................ 156/527 |

* cited by examiner

*Primary Examiner* — Alex Efta
(74) *Attorney, Agent, or Firm* — Haynes Beffel & Wolfeld LLP; James F. Hann (57) ABSTRACT

A tape dispenser, joining and dispensing a double-sided tape from two rolls of single-sided tape, includes a base having upper and lower sides, first and second spaced apart guide elements mounted to the upper side at first and second positions. First and second tape dispensing wheels, having rolls of single-sided tape mounted thereto, are mounted to the rearward portion of the upper side of the base. A handle extends from the lower side. A tape application roller is mounted to the forward portion of the base and extends above the upper side. A tape cutoff blade, or first and second cutoff blades, can be mounted to the base and extend above the upper side. An extension handle extending transversely to the handle, which can be at least 2 feet long or at least 4 feet long, can be removably mountable to the base plate.

14 Claims, 8 Drawing Sheets

DOUBLE-SIDED TAPE DISPENSER

CROSS-REFERENCE TO OTHER APPLICATIONS

This application claims the benefit of U.S. provisional patent application Ser. No. 61/844,314, filed 9 Jul. 2013, entitled Double-Sided Tape Dispenser, the disclosure of which is incorporated by reference.

BACKGROUND OF THE INVENTION

Various building projects during new construction and during work on existing buildings often requires protection of surfaces and areas from dust, debris, paint, fumes, drywall/plaster/stucco compounds, moisture, air movement, light, and even people and pets. One technique is to use double-sided tape in which adhesive is present on a first side along a first edge and on the second side along a second edge. The first side is then typically applied to a surface and a sheet of plastic or other protective material is applied to the adhesive on the second, outer side of the tape.

This type of double-sided tape is shown in U.S. Pat. No. 4,582,737. However, it is often desired to use different types of tapes with each side having different adhesive qualities. For example, conventional blue masking tape, which is relatively non-damaging to delicate surfaces, can be combined with conventional white tape, which has stronger adhesive qualities for better adhesion to material such as plastic. Also, it may be desired to mix different types of tapes, including a fabric-based tape such as duct tape with an essentially paper-based tape such as masking tape. To provide for the flexibility to join different types and sizes of tapes, various designs of tape dispensers have been created. See, for example, the following U.S. Pat. Nos. and patent publication: 4,415,400; 4,981,537; 7,028,736; 7,921,896; and US 2010/0300625.

BRIEF SUMMARY OF THE INVENTION

A tape dispenser is used to join and dispense a double-sided tape from two rolls of single-sided tape. The tape dispenser includes a base having upper and lower sides, a forward portion, a rearward portion and a centerline extending between the forward and rearward portions. A first guide element is mounted to the upper side at a first position. A second guide element is mounted to the upper side at a second position. The first and second guide elements are spaced apart by a gap. A first tape dispensing wheel is mounted to the upper side at a third position for rotation about a third axis. A second tape dispensing wheel is mounted to the upper side at a fourth position for rotation about a fourth axis, the third and fourth positions being towards the rearward portion of the base. The first and second tape dispensing wheels are each configured for receipt of a roll of single-sided tape. A handle is mounted to the lower side at a fifth position. A tape application roller is mounted to the forward portion of the base at a sixth position to extend above the upper side.

Examples of the tape dispenser can include one or more the following. A tape cutoff blade, or first and second cutoff blades, can be mounted to the base and extend above the upper side. A spacer can be positioned between the base plate and a chosen one of the first and second tape dispensing wheels. The spacer can be an adjustable height spacer. The fifth and sixth positions can be on the centerline. The first and second guide elements can include guide rollers. An extension handle can be removably mountable to the base plate. In some examples the extension handle is at least 2 feet long while in other examples the extension handle is at least 4 feet long.

Other features, aspects and advantages of the present invention can be seen on review the drawings, the detailed description, and the claims which follow.

DETAILED DESCRIPTION OF THE INVENTION

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments and examples are commonly referred to with like reference numerals.

Examples of the tape dispenser have several advantages including simplicity of construction, ergonomic placement of the handle, ease-of-use, and the ability to be used with rolls of tapes having different widths, typically three-quarter inch wide to 2.5 inches wide.

Figure 1:
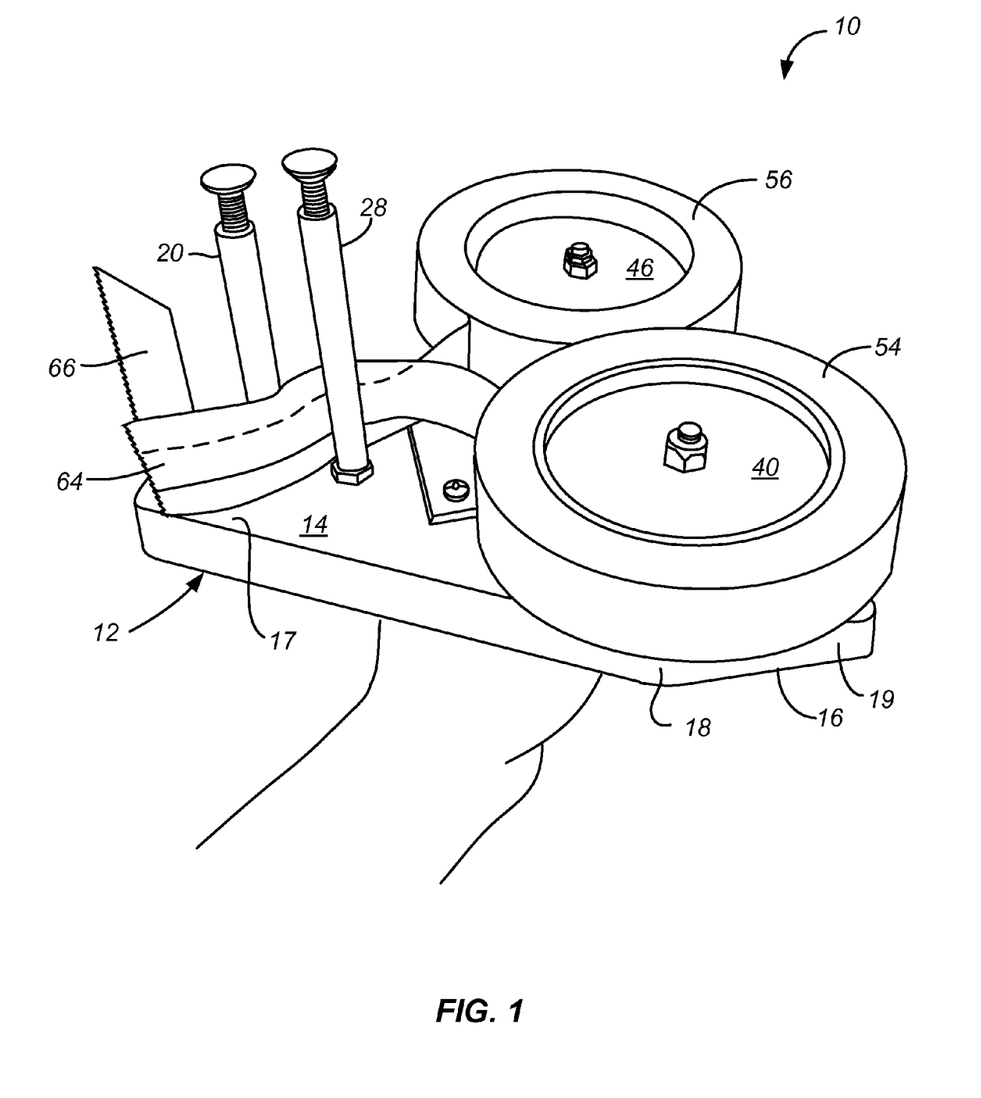
FIGS. 1 and 2 are two views showing a first example of a double-sided tape dispenser with two rolls of single-sided tape mounted to and supported by tape dispensing wheels, the tape dispenser being held by a user grasping a downwardly extending handle.
Figure 2:
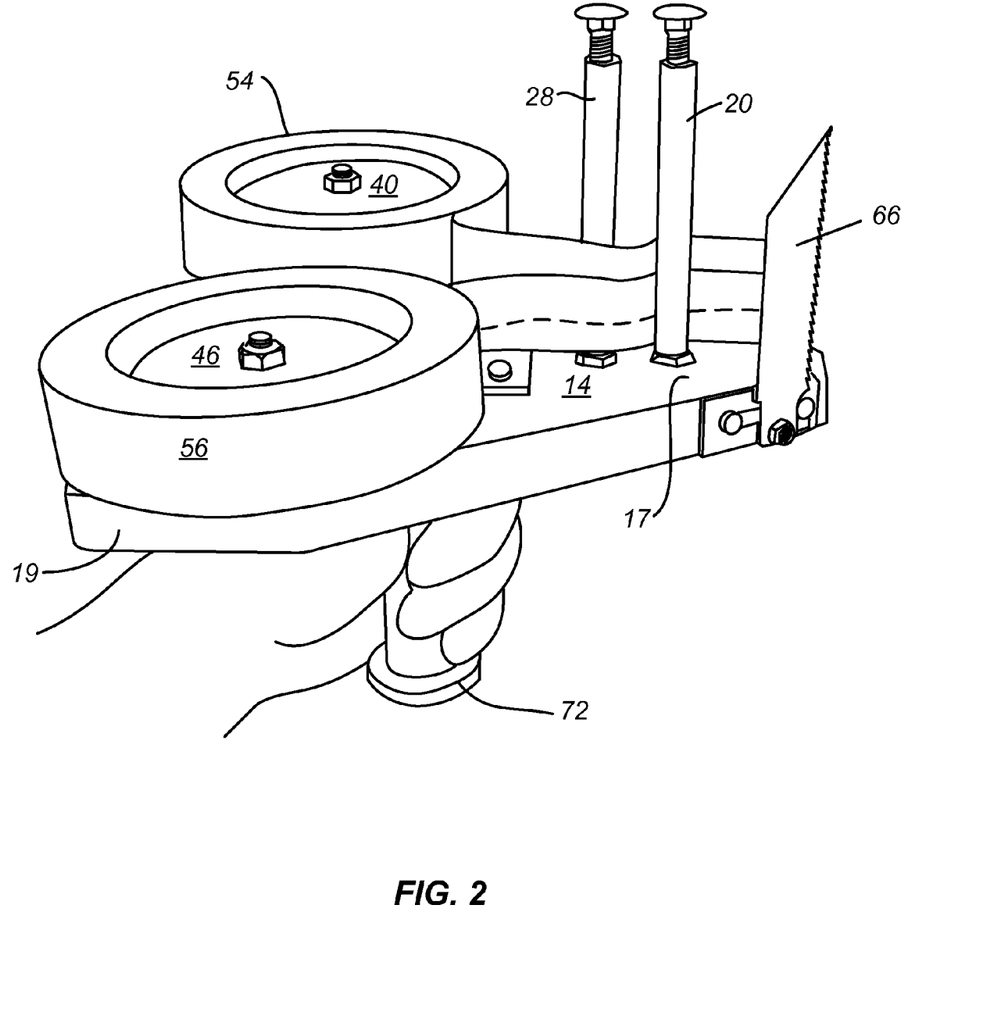
Figure 3:
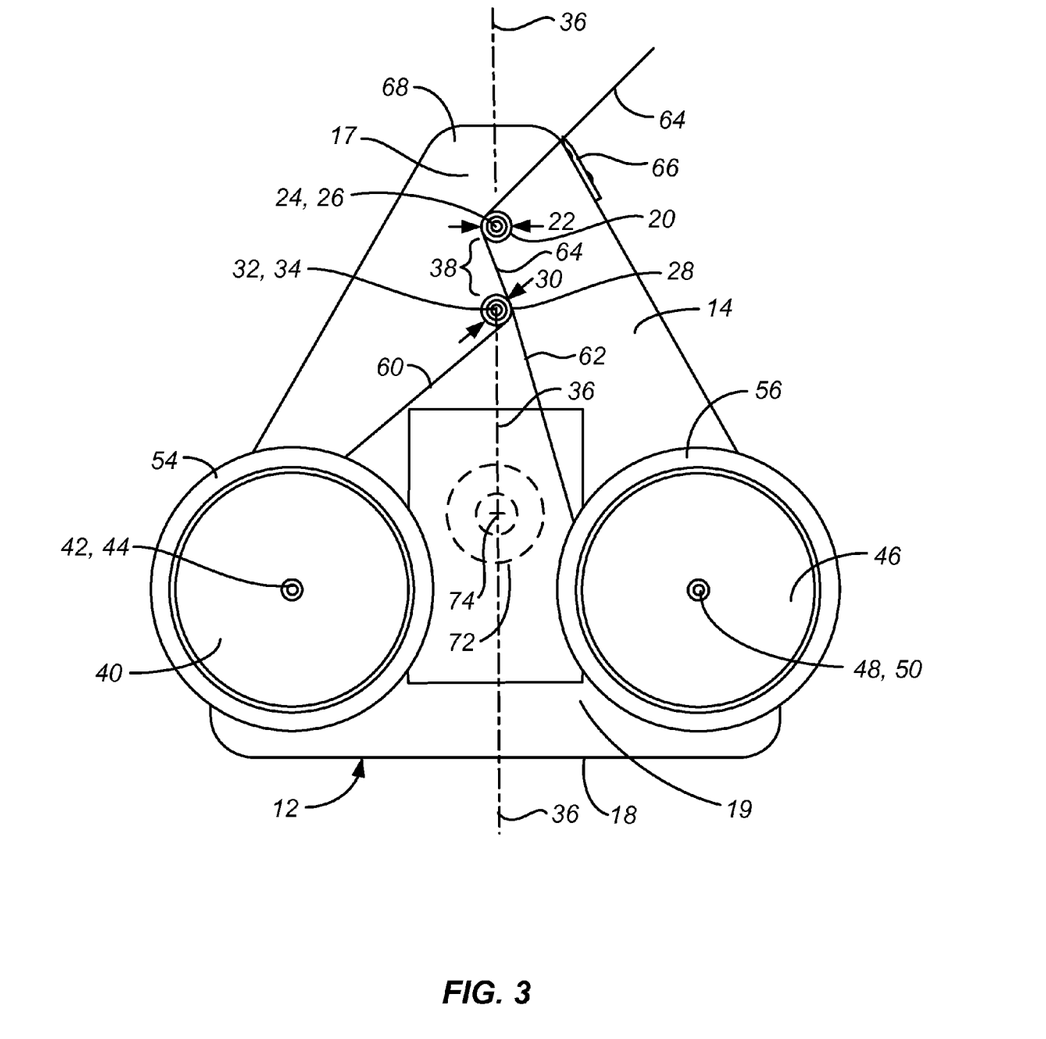
FIG. 3 is a top view of the tape dispenser of FIGS. 1 and 2 showing the paths of the single-sided tape supplied by the rolls of tape being joined to create double-sided tape.

As shown in FIGS. 1-3, a first example of tape dispenser 10 includes a base 12, sometimes referred to as base plate 12, having an upper side 14, a lower side 16 and a circumferential edge 18 joining the upper and lower sides. Base 12 also has a forward portion 17 and a rearward portion 19. Base 12 can be made of, for example, a metal, such as aluminum, wood, a polymer, or a combination thereof. A first guide roller 20, having a first diameter 22, is mounted to the upper side 14 at a first position 24 for rotation about a first axis 26. A second guide roller 28, having a second diameter 30, is mounted to the upper side 14 at a second position 32 for rotation about a second axis 34. The first and second positions 24, 32 can define a centerline 36. First and second guide rollers 20, 28 are spaced apart by a gap 38, the gap can be greater than either the first diameter 22 or the second diameter 30. Gap 38 is, in this example, about equal to the sum of first and second diameters. Gap 38 can be about 75%-150% of the sum of the first and second diameters. In this example diameters 22, 30 are each about ⅜ of an inch and gap 38 is about three quarters of an inch.

Figure 4:
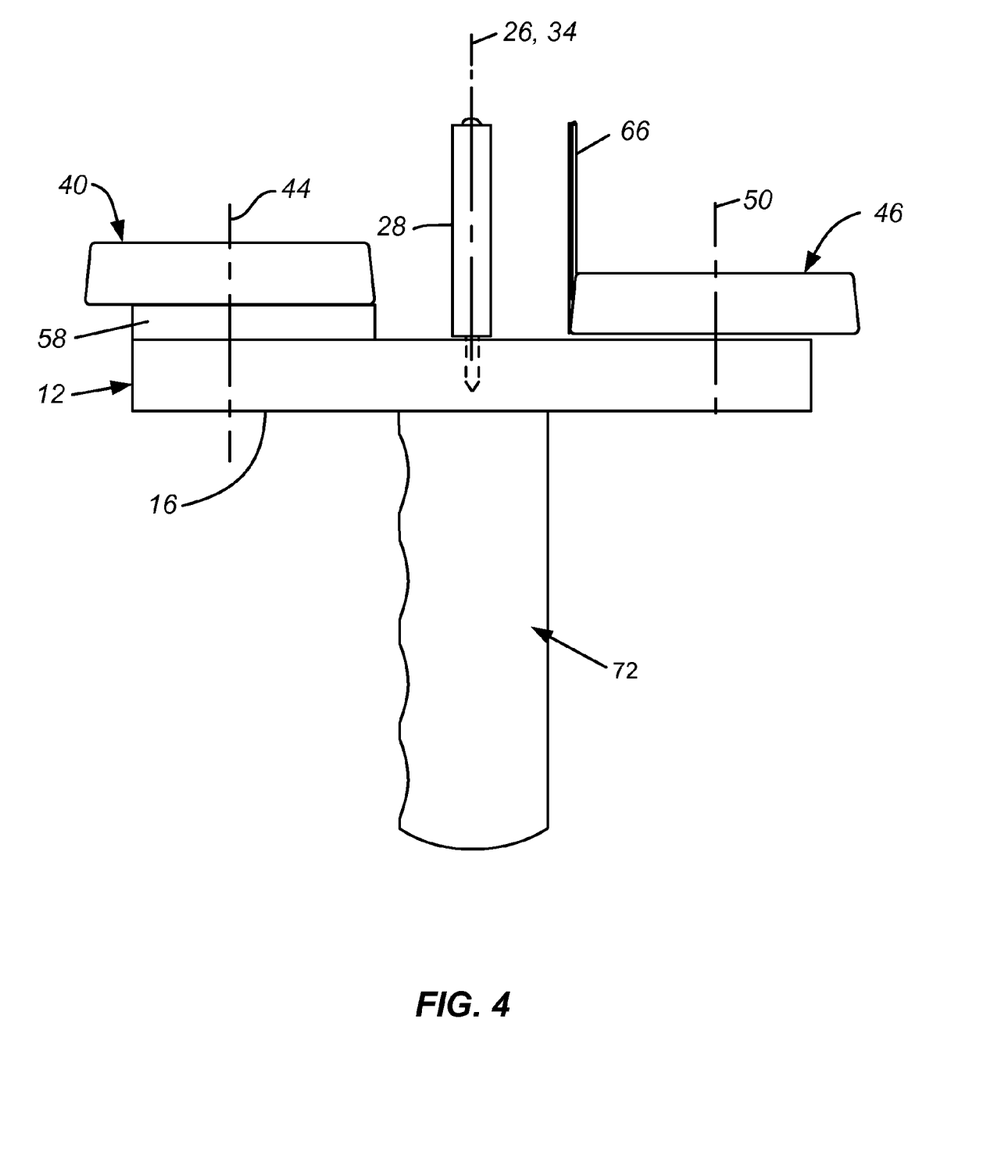
FIG. 4 is a back elevation view of a second example of a double-sided tape dispenser similar to that of FIGS. 1-3 without the rolls of tape.

A first tape dispensing wheel 40 is mounted to the upper side 14 at a third position 42 for rotation about a third axis 44. A second tape dispensing wheel 46 is mounted to the upper side 14 at a fourth position 48 for rotation about a fourth axis 50. Third and fourth positions 42, 48 are located at rearward portion 19 on opposite sides of centerline 36. In this example third and fourth positions 42, 48 are located equidistant from centerline 36. The outer sidewalls of tape dispensing wheels 40, 46 can be tapered upwardly and inwardly for receipt of first and second rolls 54, 56 of single-sided tape. In this example a spacer 58, see FIG. 4, is used between first tape dispensing wheel 40 upper side 14 a base plate 12 so to provide a proper offset, such as ⅜ of an inch, for the joining of first tape 60 and second tape 62 to create double-sided tape 64. The thickness of spacer 58 is largely determined by the width of the rolls of tape and the desired amount of overlap of first and second tape 60, 62. A spacer 58 may be used under second tape dispensing wheel 46 instead of or in addition to under first tape dispensing wheel 40. A cutoff blade 66 is mounted to outlet is forward portion 17 of the base plate 12 at the front end 68 of the base plate and extends upwardly of upper side 14. Cutoff blade 66 is used to sever double-sided tape 64 at the proper location along the double-sided tape.

A handle 72 is mounted to and extends downwardly from lower side 16 of base plate 12 at a fifth position 74. Handle 72 can be made of a range of materials, such as metal, polymers, wood, or a combination thereof. Fifth position 74 is located within a region defined by the second position 32, third position 42 and fourth position 48. In this example fifth position 74 is located on centerline 36. It has been found that positioning handle 72 beneath base plate 12 at a centered, balanced position lessen the strain on the user.

Figure 5:
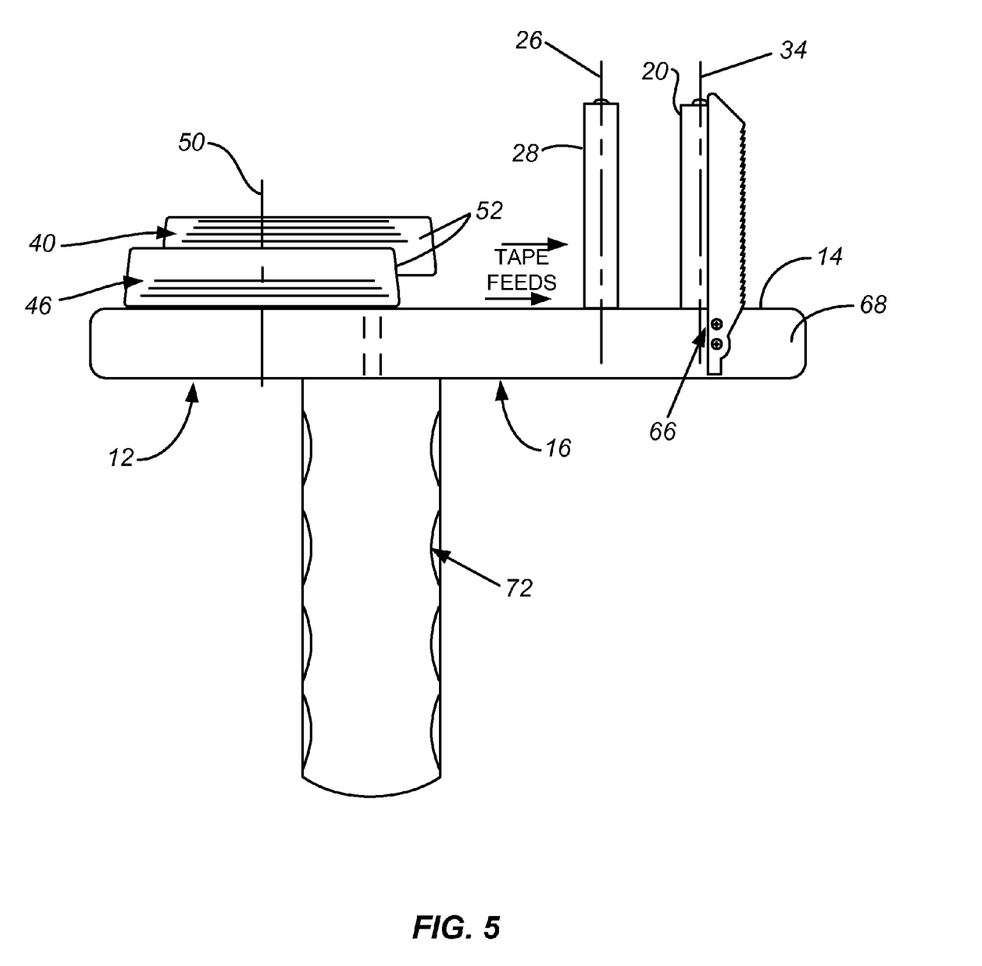
FIG. 5 is a right side elevation view of the tape dispenser of FIG. 4.

FIGS. 4 and 5 illustrate a second example of a tape dispenser 10 with like reference numerals referring to like elements. The main differences are as follows. Base plate 12 is this second example a metal base plate, typically ¼ inch thick aluminum plate, having a triangular shape. The triangular shape promotes the effective use of the stock material from which base plate 12 is made. The various holes formed in base 12 are typically threaded to provide additional stability for various components mounted thereto using threaded elements, including guide rollers 20, 28, dispenser wheels 40, 46 and handle 72. Two cutoff blades 66 are secured to forward portion 17 of base plate 12 at front end 68 to permit the double-sided tape 64 to be severed in either direction. Fixed height spacer 58 is in this second example an adjustable height, threaded spacing mechanism.

Figure 6:
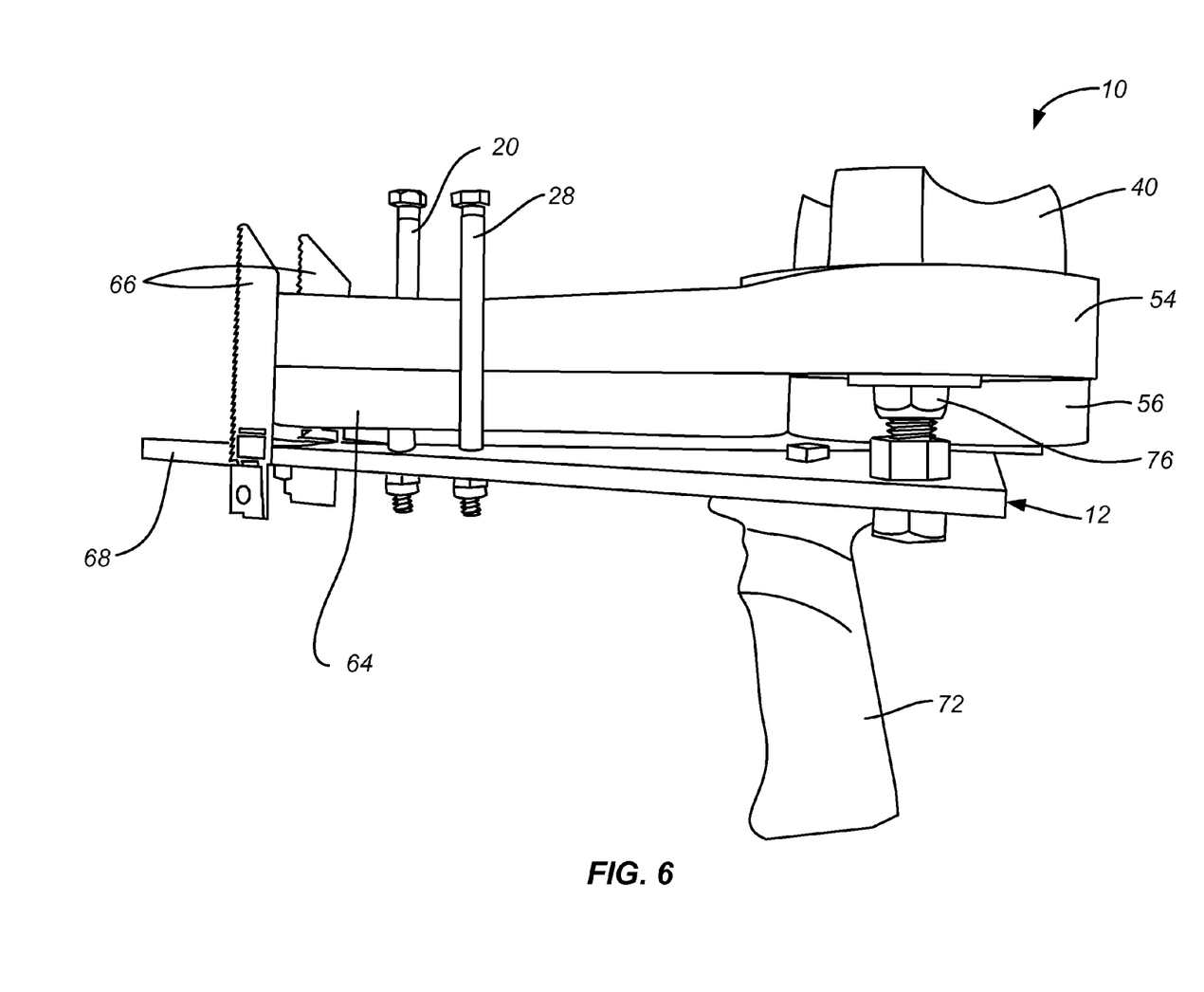
FIG. 6 is a left side elevation view of a third example of a double-sided tape dispenser.

In the third example illustrated in FIG. 6, tape dispensing wheels 40, 46 are of a conventional design and are taller than the examples of FIGS. 1-5 to accommodate rolls of tape having a greater range of widths. Tape dispensing wheels 40, 46 also have a generally Y cross-sectional shape, instead of being solid, to save on material.

Figure 7:
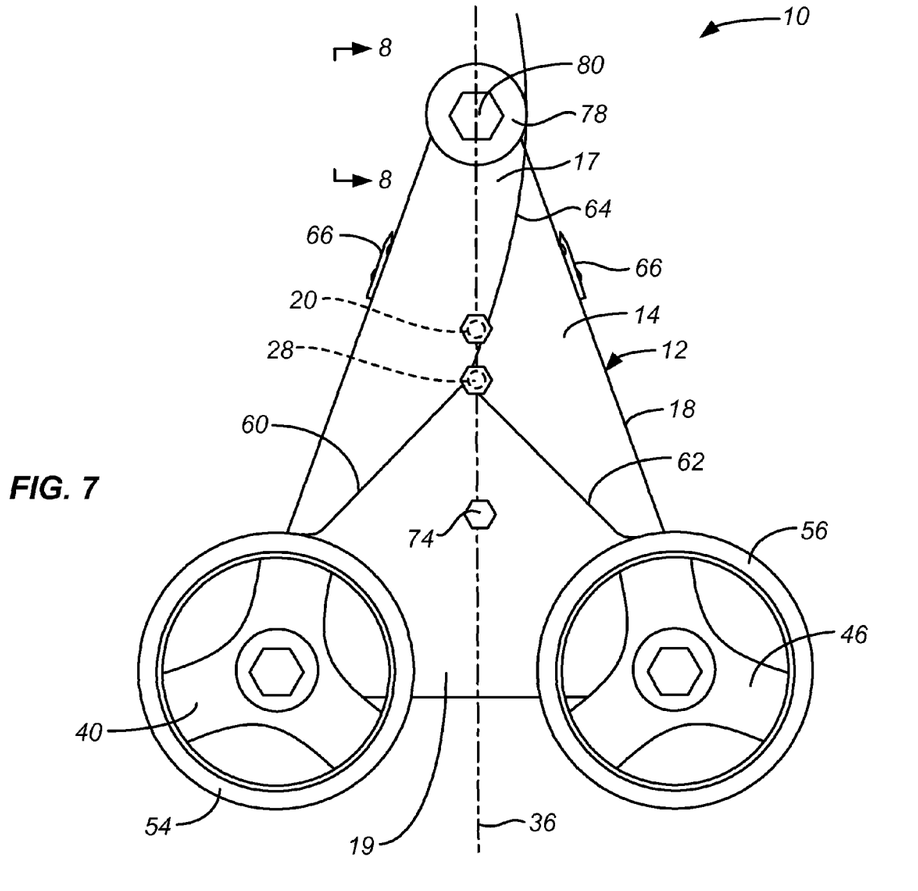
FIG. 7 is a top plan view of a fourth example of a double-sided tape dispenser.
Figure 8:
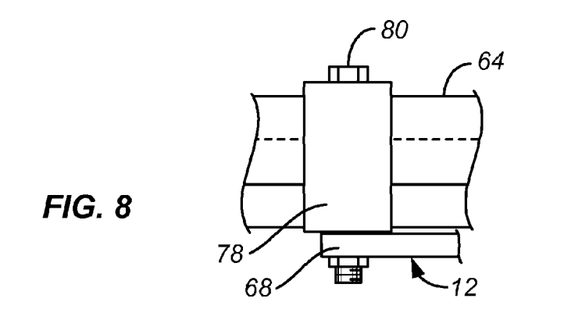
FIG. 8 is a side view taken along line 8-8 of FIG. 7 showing the tape application roller of the fourth example of FIG. 7.
Figure 9:
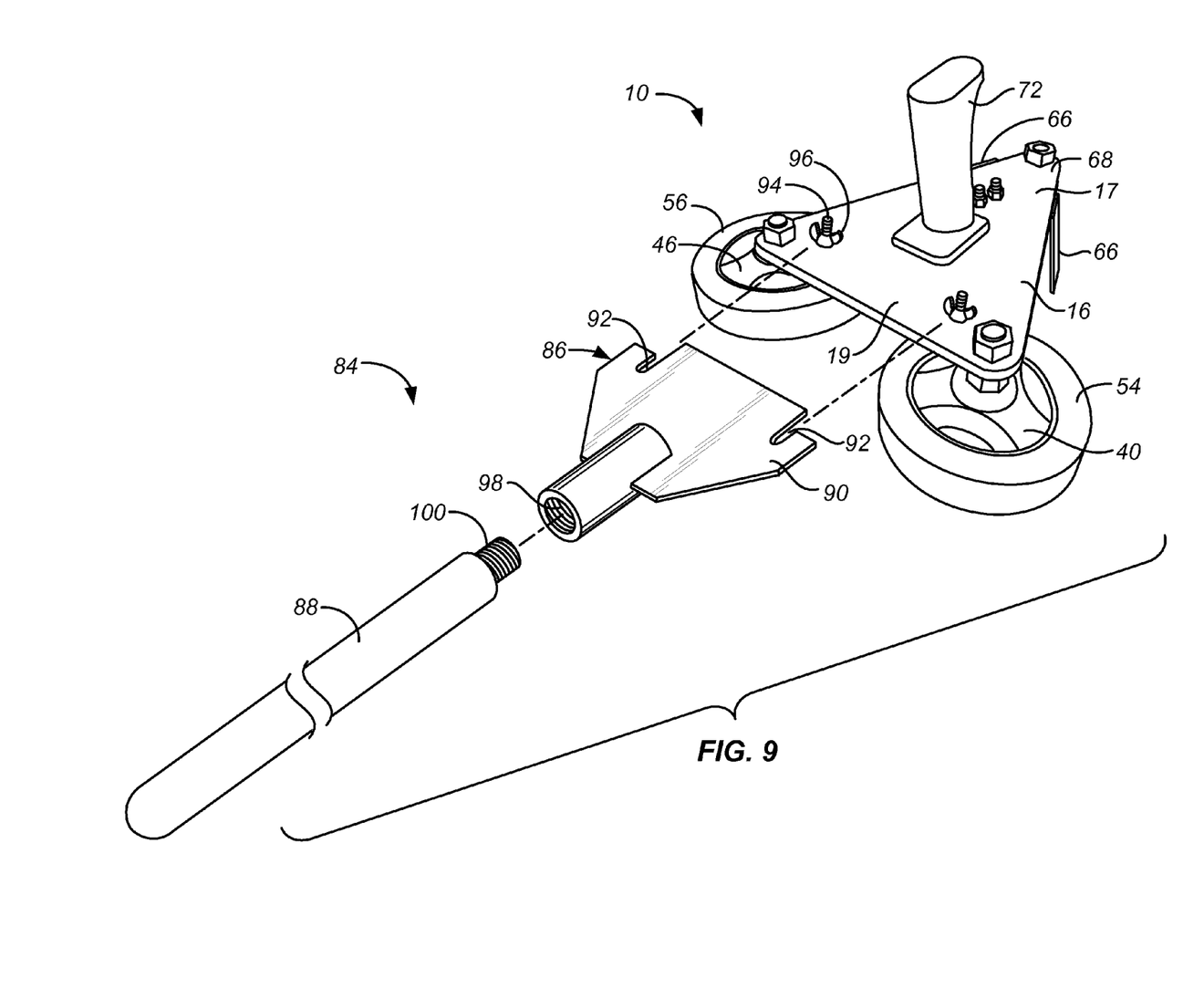
FIG. 9 is an exploded view including a bottom perspective view of the double-sided tape dispenser of FIG. 7 and an extension assembly, the extension assembly including an extension handle attachment and an extension handle.

FIGS. 7-9 illustrates a fourth example of tape dispenser 10. As shown in FIGS. 7 and 8, a tape application roller 78 is rotatably mounted at a sixth position 80 at forward portion 17 of base 12 at front end 68. The provision of tape application roller 78 allows the user to press double-sided tape 64 against a surface using roller 78. Roller 78 can have an outer surface made of resilient material, such as a roller having a plastic core and a rubber outer surface.

During use double-sided tape 64 can have a tendency to stick to tape application roller 78. However, the double-sided tape 64 typically sticks better to the wall or other surface than to roller 78, especially after a short length of tape has been applied to the surface. Similarly, although single-sided tape 60, 62 will have a tendency to stick to guide rollers 20, 28, it has not proven to be a problem. In some circumstances, depending on the adhesive characteristics of the tape and the surface to which the tape is applied, it may be desired to use a material for roller 78 and/or guide rollers 20, 28 to which the tape does not have a tendency to stick.

After the double-sided tape 64 has been applied to the surface, in the example of FIG. 7 the double-sided tape can be severed by the user first rotating tape dispenser 10 in counterclockwise direction; this allows double-sided tape 64 to disengage from roller 78, contact blade 66 on the right-hand side of base 12 and be severed.

FIG. 9 is an exploded view including a bottom perspective view of the double-sided tape dispenser 10 of FIGS. 7 and 8. FIG. 9 also shows an extension assembly 84 which can be used with tape dispenser 10 to mask off, for example, high ceilings, or other distant surfaces. Extension assembly 84 includes an extension handle attachment 86 and an extension handle 88. Extension handle 88 extends in a direction transversely to, typically perpendicular to, handle 72. Extension handle 88 is preferably at least 2 feet long, and in some situations can be at least 4 feet long, which should be sufficient for most ceilings. However there may be circumstances in which extension handle 88, which may be fixed length or telescoping, could be at least 10 feet long.

Extension handle attachment 86 includes a plate 90 having a pair of notches 92 sized and positioned to engage mounting bolts 94 extending from lower side 16 of plate 12. Once in position, wing nuts 96 on mounting bolts 94 are tightened down to secure extension handle attachment 86 to lower side 16 of base 12. Extension handle attachment 86 also includes a threaded bore 98, acting as a first attachment element 98, to which the threaded end 100 of extension handle 88, acting as a second attachment element 100, can be secured. In some examples first attachment element 98 can be an integral part of base 12. Also, attachment structures other than threads, such as twist lock attachment mechanisms, can be used.

The above descriptions may have used terms such as above, below, top, bottom, over, under, et cetera. These terms may be used in the description and claims to aid understanding of the invention and not used in a limiting sense.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims.

Any and all patents, patent applications and printed publications referred to above are incorporated by reference.

What is claimed is:

1. A tape dispenser for joining and dispensing a double-sided tape from two rolls of single-sided tape comprising:
   a base having upper and lower sides, a forward portion, a rearward portion and a centerline extending between the forward and rearward portions;
   a first guide element mounted to the upper side at a first position;
   a second guide element mounted to the upper side at a second position;

the centerline passing through the first and second positions;
the first and second guide elements spaced apart by a gap;
a first tape dispensing wheel mounted to the upper side at a third position for rotation about a third axis;
a second tape dispensing wheel mounted to the upper side at a fourth position for rotation about a fourth axis, the third and fourth positions being towards the rearward portion of the base and positioned on opposite sides of the centerline;
the first and second tape dispensing wheels each configured for receipt of a roll of single-sided tape;
an adjustable height spacer positioned between the base plate and a chosen one of the first and second tape dispensing wheels;
a handle mounted to and extending generally perpendicularly away from the lower side at a fifth position;
a tape application roller mounted to the forward portion of the base at a sixth position to extend above the upper side; and
a tape cutoff blade mounted to the base at a seventh position and extending above the upper side, the seventh position being perpendicular to a location along the centerline, said location being between the first position and the sixth position so that the tape application roller is forward of the cutoff blade.

2. The tape dispenser according to claim 1, further wherein said tape cutoff blade comprises first and second tape cutoff blades mounted to the base on either side of the centerline.

3. The tape dispenser according to claim 1, wherein the fifth and sixth positions are on the centerline.

4. The tape dispenser according to claim 1, wherein the first and second guide elements comprise guide rollers.

5. The tape dispenser according to claim 1, further comprising an extension handle removably mountable to the base plate and extending transversely to the handle, the extension handle being at least 2 feet long.

6. The tape dispenser according to claim 5, wherein the extension handle is at least 4 feet long.

7. The tape dispenser according to claim 1, further comprising an extension assembly, the extension assembly comprising:
an extension handle attachment removably mountable to the base and having a first attachment element;
an extension handle having a second attachment element removably mountable to the extension handle attachment through engagement of the first and second attachment elements, the extension handle being at least 4 feet long and extending in a direction generally perpendicular to handle.

8. The tape dispenser according to claim 1, wherein the first and second attachment elements are threaded elements.

9. The tape dispenser according to claim 1, wherein:
the third and fourth position are on opposite sides of the centerline; and the second position is closer to the forward portion of the base than the first position is to the forward portion of the base.

10. A tape dispenser for joining and dispensing a double-sided tape from two rolls of single-sided tape comprising:
a base plate having upper and lower sides and a circumferential edge joining the upper and lower sides;
a first rotatable guide element, having a first diameter, mounted to the upper side at a first position for rotation about a first axis;
a second rotatable guide element, having a second diameter, mounted to the upper side at a second position for rotation about a second axis;
a centerline passing through the first and second positions;
the base plate having a forward portion and a rearward portion with the centerline extending between the rearward and forward portions;
the first and second guide elements spaced apart by a gap, the gap being greater than either of the first or second diameters;
a first tape dispensing wheel mounted to the upper side at a third position for rotation about a third axis;
a first roll of single-sided tape mounted to the first tape dispensing wheel;
a second tape dispensing wheel mounted to the upper side at a fourth position for rotation about a fourth axis;
the third and fourth positions being towards the rearward portion;
a second roll of single-sided tape mounted to the second tape dispensing wheel;
the third and fourth position being on opposite sides of the centerline;
the second position being closer to the third and fourth positions than the first position is to the third and fourth positions;
first and second tape cutoff blades mounted to the base plate on either side of the centerline and extending above the upper side;
an adjustable height spacer positioned between the base plate and a chosen one of the first and second tape dispensing wheels;
a handle mounted to and extending generally perpendicularly away from the lower side at a fifth position within a region defined by the second, third and fourth positions;
a tape application roller mounted to the forward portion of the base plate at a sixth position to extend above the upper side, whereby tape from the first and second rolls of tape pass between the first and second guide elements to create a double-sided tape, the double-sided tape extending to the tape application roller for application of the double-sided tape onto a surface;
the first and second tape cutoff blades mounted to the base at seventh and eighth positions, the seventh and eighth positions being perpendicular to locations along the centerline, said locations being between the first position and the sixth position so that the tape application roller is forward of the cutoff blade; and
an extension handle removably mountable to the base plate, the extension handle being at least 2 feet long and extending in a direction generally perpendicular to the handle.

11. The tape dispenser according to claim 10, wherein the fifth and sixth positions are on the centerline.

12. The tape dispenser according to claim 10, wherein the gap is about equal to 75%-150% of the sum of the first and second diameters.

13. The tape dispenser according to claim 10, wherein the extension handle is at least 4 feet long.

14. The tape dispenser according to claim 10, further comprising:
an extension handle attachment removably mountable to the base plate and having a first attachment element, the extension handle having a second attachment element removably mountable to the extension handle attachment through engagement of the first and second attachment elements.

* * * * *